G. L. EHRHART.
HANDLE.
APPLICATION FILED JULY 12, 1921.

1,401,896. Patented Dec. 27, 1921.

G. L. Ehrhart, Inventor
By [signature], Attorney

UNITED STATES PATENT OFFICE.

GEORGE L. EHRHART, OF TITUSVILLE, PENNSYLVANIA.

HANDLE.

1,401,896.  Specification of Letters Patent.  Patented Dec. 27, 1921.

Application filed July 12, 1921. Serial No. 484,101.

*To all whom it may concern:*

Be it known that I, GEORGE L. EHRHART, a resident of Titusville, in the county of Crawford and State of Pennsylvania, a citizen of the United States, have invented certain new and useful Improvements in Handles, of which the following is a specification.

My invention relates to improvements in handles and refers particularly to a handle for use in connection with hammers, hatchets, axes and other implements of this general character, although its use is not limited and the construction may be employed for any purpose where it would perform its function in an efficient and practical manner.

The main object of my invention is the provision of a handle which will possess a desired amount of elasticity or resiliency to produce what may be termed a spring handle, which while not in the least injuring the strength and durability of the handle will greatly enhance its desirability and usefulness and make its use free from shock or injury to the hand of the user.

Another object of my invention is the provision of a handle of the character and for the purposes stated which will present the general outline and appearance of the usual handle and which will not add any weight to such handle, while being capable of production at the proper price to insure a much desired and practical article.

To attain the desired objects the invention consists in the combination with the handle, of a spring wound upon and conforming to the general outline of the handle and providing an elastic portion in said handle.

The invention further consists of a handle embodying novel features of construction and combination of parts substantially as shown, described and particularly defined by the claims, it being understood that such changes may be made in structure as fall within the scope of such claims.

In order that the construction in detail and the features of merit which my invention possesses may be more fully understood, I have shown in the accompanying drawing a handle embodying my improvements and to which reference is made and in which.

Figure 1:
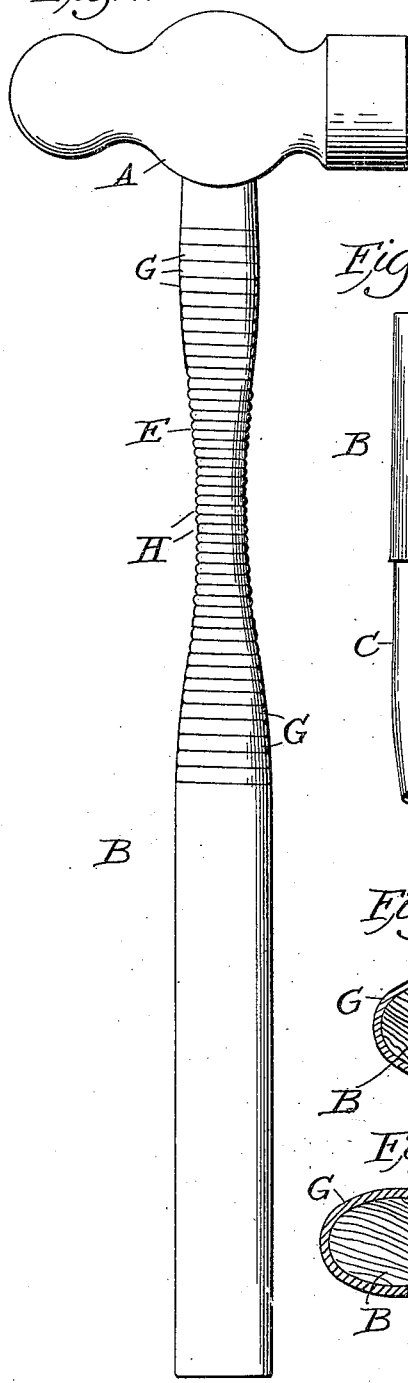
Figure 1 represents a side elevation of a hammer handle constructed in accordance with and embodying my invention.
Figure 2:
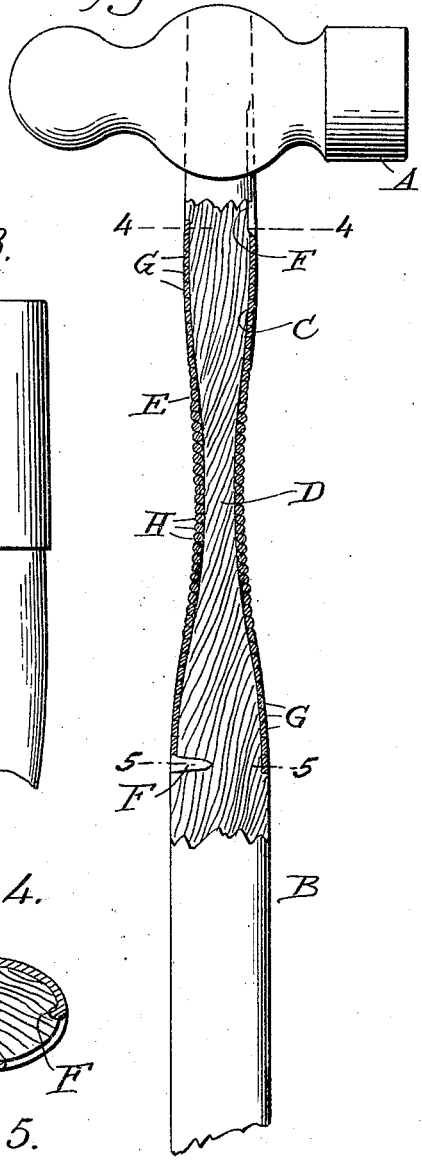
Fig. 2 represents a view partly in elevation and partly in section of the handle.
Figure 3:
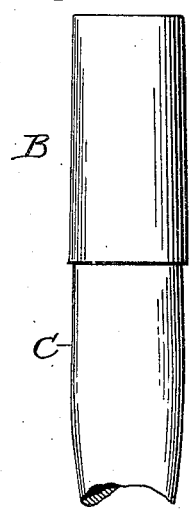
Fig. 3 represents a detail view showing the manner of channeling or recessing the handle to receive the spring or resilient element.
Figure 4:
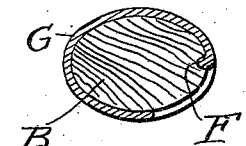
Fig. 4 represents a sectional view on line 4—4 of Fig. 2.
Figure 5:
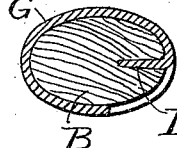
Fig. 5 represents a sectional view on line 5—5 of Fig. 2.

The handle may be used for any purpose where it would serve and for the purpose of illustration is shown in connection with a hammer A, the handle B being of any desired length and being formed with the recessed or channeled portion C, which is reduced in size as shown at D, and fitting within said channeled portion C, and conforming to the general outline of the handle structure, is the elastic or spring element E, which is formed at each end with inturned prongs F, which secure the element in place and said element consists of the flattened coils G, at each end which gradually assume the round or circular configuration H, such coils being disposed centrally of said element and at the point where a desired amount of movement will be allowed the entire spring structure, thus giving to the handle a certain amount of elasticity and at the same time maintaining the necessary rigidity to insure efficient service.

It will thus be apparent that I provide a spring construction which may be adapted with slight or moderate changes to handles in general use, or which will permit of the handles being manufactured with my improvement and that such structure will not add materially to the cost of the handle, also will not add to the weight or interfere in any manner with the function of the handle, but on the contrary will insure an improvement which will greatly enhance the efficiency, usefulness and desirability of the handle.

I claim:

1. A wooden handle having a portion of its length reduced to make it yieldable and a closely wound spiral spring reinforcing such reduced portion and increasing its elasticity.

2. A wooden handle having a portion of its length reduced to make it yieldable and a closely wound spiral spring reinforcing such reduced portion and increasing its elasticity, said spring wound portion being recessed to bring the exterior surface of the spring substantially flush with the body of the handle at each end of the spring.

In testimony whereof I hereunto affix my signature.

GEORGE L. EHRHART.